Figure 1:
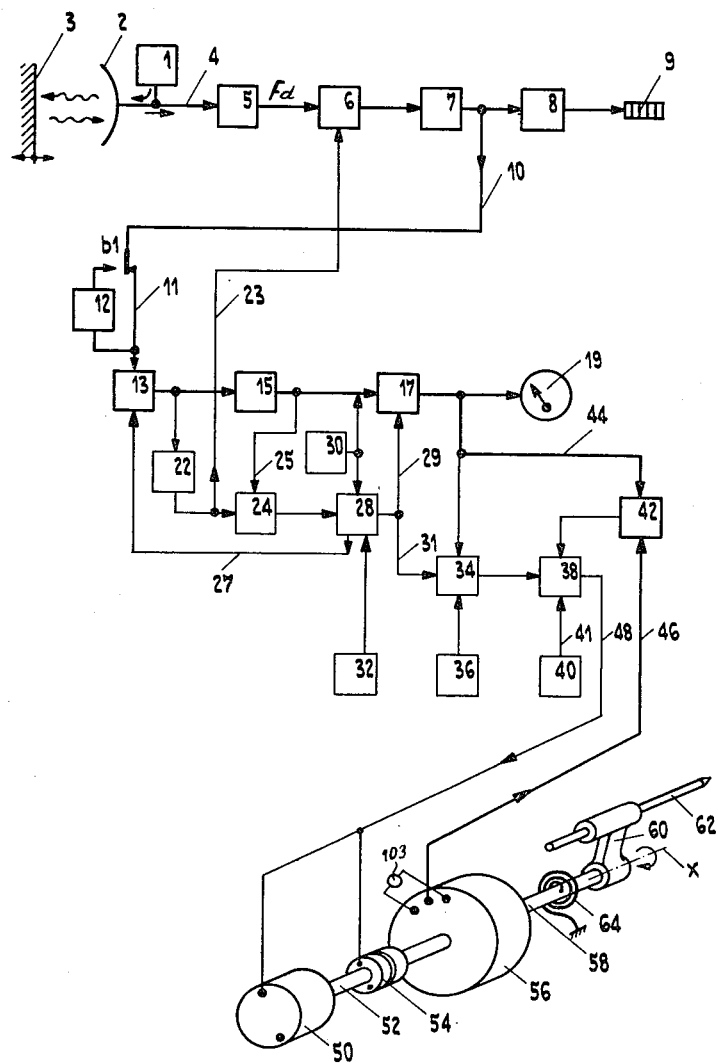

June 16, 1964   M. G. HANDSCHIN   3,137,538
APPARATUS FOR MEASURING AND RECORDING THE SPEED OF
MOTOR VEHICLES, ESPECIALLY ROAD VEHICLES
Filed April 19, 1962   2 Sheets-Sheet 2

INVENTOR.
Max Gustav Handschin
BY
Caesar and Rivise
ATTORNEYS.

United States Patent Office 3,137,538
Patented June 16, 1964

3,137,538
APPARATUS FOR MEASURING AND RECORDING THE SPEED OF MOTOR VEHICLES, ESPECIALLY ROAD VEHICLES
Max Gustav Handschin, Kusnacht, Zurich, Switzerland, assignor to Multanova AG., Kusnacht, Switzerland, a corporation of Switzerland
Filed Apr. 19, 1962, Ser. No. 188,768
Claims priority, application Switzerland Apr. 21, 1961
19 Claims. (Cl. 346—18)

The present invention broadly relates to new and improved apparatus for measuring and recording the speed of objects such as vehicles, especially road vehicles by means of a radar installation, in which preferably in accordance with the Doppler effect an electrical signal or level is produced which is characteristic of speed.

Radar installations have been developed for controlling the speed of road vehicles, especially for police checking and regulating the speed limits of traffic. Such radar installations deliver an electrical signal or level which is proportional to the speed of the observed vehicle. The measured value can be observed on a radar screen and, as a general rule, can be read-off an indicating instrument. For the purpose of arriving at the important information and documentation, the measured value must be read-off the instrument by the person observing it and must be recorded on a data sheet, which naturally is cumbersome and does not obviate reading errors.

In order to prevent such reading errors there has also been developed apparatus which produces a photographic reproduction of the indicating instrument, possibly together with other data, as for example the time of day, and preferably in conjunction with a photograph of the vehicle itself, in such a manner that also the license number of the vehicle is recognizable. However, before the finished proof is available the entire photographic developing process must be undertaken, which takes such a long time that, at any rate, the proof can not be presented as evidence of a traffic violation to the driver at the place where the traffic infraction has occurred. Additionally, such a system has the disadvantage that all measurements must be recorded, also those speeds which do not represent an excess of the speed limit. Such a process naturally results in a waste of photographic material, since only a small percent of the measurements can be evaluated for punishing drivers who exceed the prescribed speed limit.

Accordingly, it is an important object of the present invention to provide improved means for measuring and recording the speed of moving objects, especially road vehicles, which overcomes the aforedescribed disadvantages of existing apparatus of this type.

Another important object of the present invention is to provide improved means for measuring and recording the speed of vehicles or otherwise, in an extremely accurate and reliable manner.

A further important object of the present invention is the provision of improved speed recording apparatus wherein the speed recording on a data sheet is automatically executed in a reliable and accurate manner.

Another important object of the present invention is the provision of speed recording apparatus of the type described which only records and measures significant information, and once a measurement has been made and is being processed, prevents subsequent measurements from being performed until a prescribed action has been undertaken, such as removal of the recording data sheet from the apparatus.

Yet another important object of the present invention is the provision of improved speed recording apparatus including means for presetting the speed desired to be recorded.

Still a further important object of the invention is the provision of improved speed recording apparatus which is brought into operable readiness by insertion of a data sheet, the latter of which automatically actuates frequency divider means so that a proper speed reading will appear on such data sheet in consequence of the indexing or markings appearing thereon.

Generally speaking, in accordance with the teachings of the present invention there is provided an apparatus for measuring and recording the speed of moving objects, particularly road vehicles, wherein a transmitted wave is reflected by said road vehicle and generates an electric signal characteristic for the speed of movement of said vehicle according to the Doppler effect. Thus, there is provided, in combination, a writing instrument adapted to be displaced through a prescribed path of travel to perform a marking on a suitably calibrated data sheet indicating such speed of movement, drive means operatively connected to said writing instrument, variable voltage generating means cooperating with said writing instrument for generating a voltage which is a function of the displacement of said writing instrument, and an electric circuit coupled to said voltage generating means and said drive means. The electric circuit includes means for producing an electric signal indicative of speed of movement of said vehicle, means for supplying an electric signal to said drive means to actuate the latter, and means for comparing said voltage of said voltage generating means with said speed indicative electric signal and adapted to arrest displacement of said writing instrument when said voltage and speed indicative electric signal are equal.

Further, the electric circuit is provided with frequency divider means adapted to be actuated into an operable position upon insertion of a specific form of data sheet. Moreover, this electric circuit includes storage means for storing the speed indicative electric signals, a start delay circuit responsive to a clear, distinct signal at the input of said storage means, switch means for controlling said storing means, as well as limiting means and coupling circuit means for supplying an electric signal of predetermined value to the drive means in order to displace the writing instrument through its prescribed path of travel.

Still further objects of the present invention and the entire scope of applicability thereof will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 2:
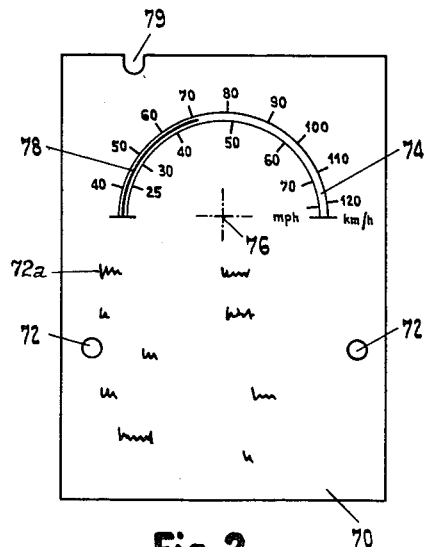
Figure 3:
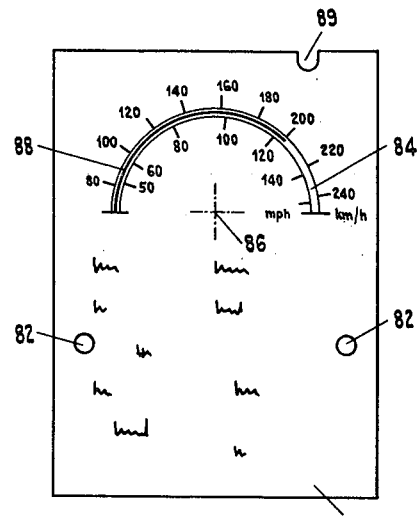
Figure 4:
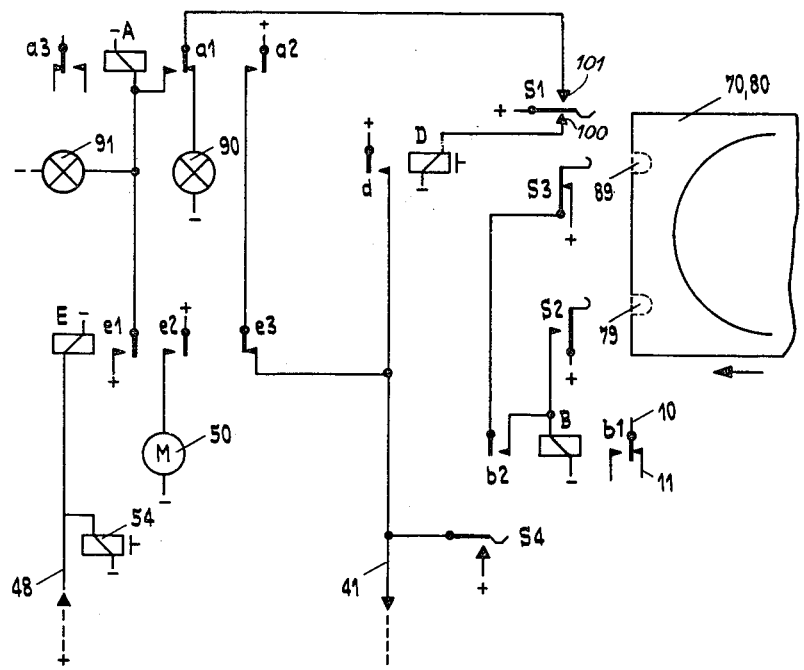

In the drawings:
FIGURE 1 is a block diagram of the entire arrangement of speed recording apparatus designed according to the present invention;
FIGURES 2 and 3 diagrammatically represent two data sheets having suitable markings thereon for different speed ranges with space for recording other pertinent information; and
FIGURE 4 is a circuit diagram of the relay control circuit for the apparatus depicted in FIGURE 1.

Referring now to the drawings, the apparatus depicted in FIGURE 1 is a portable or transportable unit which serves for checking the speed of road vehicles, particularly adapted for police control and law enforcement against motorists who exceed prescribed speed limits. Thus, there is provided a microwave generator 1 which feeds a parabolic antenna 2 which is generally arranged at the edge of the road area to be observed, and delivers a directed wave packet or beam cut at a predetermined angle by the passing motor vehicles or moving objects. By virtue of such object 3 appearing in the path of the wave train a portion of the wave will be reflected back to the antenna 2, whereby the wave length will vary up (on-coming vehicles) or down (away-moving vehicles) according ot the speed of the object 3 from the wave length of the transmitted beam. The transmitted and the reflected wave arrive together with the line 4 at a crystal diode in a mixing stage 5. At the output terminals of this mixing stage 5 there appears the differential Doppler frequency $f_d$ of both waves. This differential frequency $f_d$ is, while taking into account the angle $\gamma$ between the transmitted wave beam and the direction of travel, a specific or unmistakeable measure for the speed of travel V of the object. If, for example, as in the previous instance, there appears a transmission frequency of 9420 megacycles ($\lambda = 3.189$ cm.) and an angle $\gamma$ of 20° ($\cos \gamma = 0.940$), then, in accordance with the well known Doppler principal, there can be calculated the relationship:

$$f_d = 16.39 \cdot V \text{ (km./h.)}$$

The Doppler frequency or oscillation achieved in this known manner and having the frequency $f_d$, is then amplified in a preamplifier 6. The signal thereafter controls a square wave or rectangular generator 7. This generator 7 has a predetermined threshold limit so that only signals of a predetermined minimum size square or rectangular wave pulse will be further supplied. The square or rectangular wave pulses are further integrated into voltage impulses in an integrator 8, which in each instance disappears after passing of the vehicle has occurred, and serves for carrying out a continuous switching operation of an electro-mechanical traffic counter 9.

The square or rectangular wave pulses of frequency $f_d$ pass via a conductor 10 to a second square or rectangular wave generator 13. These pulses pass either via the rest position of a contact switch $b_1$ directly through conductor 11 as shown in FIGURE 1, or when the contact switch $b_1$ is actuated through a frequency divider 12, the function and purpose of which will be more fully described hereinafter. The square or rectangular wave generator 13 produces by means of the frequency of the incoming impulses well defined square or rectangular wave impulses possessing exactly defined areas. These square wave impulses are delivered and received at the input terminals of a second integration network 15 which integrates them into a voltage level which represents an exact measurement of the speed of the wave-reflecting motor vehicle or object 3. This voltage level or signal is fed by means of a storage network 17 to a conventional capacitor (not shown) for a predetermined time, for example for three seconds, and is then supplied to an indicating instrument 19, at which the measured speed can be read-off for the previously mentioned storage time.

At the output terminals of the square wave generator 13 there is further arranged a rectifier circuit 22 which produces a control potential due to the incoming square wave oscillations. This control voltage or potential is delivered, on the one hand, via the line 23 to the preamplifier 6 where it renders inoperative a suitable damping resistance of a transistor in a manner familiar to the art. As a result, the gain or amplification rate of the preamplifier 6 is increased after the first oscillation and upon the appearance of a signal due to passing of a motor vehicle, so that subsequent oscillations can be positively processed.

The control voltage is further supplied via a so-called start-delay-circuit means 24 to a control switch means 28. The transmission response of the start-delay circuit 24 is dependent upon the presence of a clear, unmistakeable, steady signal at the output terminals of the integrator 15 which is supplied via conductor 25 to the start-delay circuit 24. As a result, there is prevented further processing of or spurious signals which may be generated for example, by loose or trailing portions of the motor vehicle (e.g. door ledges or the like), and the consideration of which could falsify the measured result.

A control switch 28 is arranged at the output side of start-delay circuit 24 and is preferably a univibrational switch which fulfills different functions. Upon arrival of the control voltage it controls the discharge of the storage network 17 via conductor 29 and delivers the starting signal for the writing means via conductor 31. Additionally, this control switch 28 shuts-off or blocks the square wave generator 13 via the feed-back conductor 27 in order to prevent that an evaluation and processing of a supplied voltage level is blocked by subsequently passing motor vehicles. The control switch 28 is also influenced by a test circuit 30, such as a variable voltage source, which upon actuation of a suitable testing switch (not shown) delivers a reference voltage level of known magnitude to the storage circuit 17, and at the same time initiates a recording operation via the control switch 28, whereby satisfactory adjustment of the apparatus can be carried out. Finally, there is operatively connected with the control switch 28 an extinguishing or cut-out circuit 32. This cut-out circuit 32 operates actuation of a suitable cut-out switch known to the art which extinguishes ahead of time a supplied voltage level and represses storage and recording of incoming signals.

At a limiting circuit 34 there appears at one side the stored signal or voltage level, and on the other side, from a preselector circuit 36 such as a variable voltage source, there appears a continuously adjustable reference voltage which corresponds to a predetermined maximum permissible vehicle speed. If the starting or ignition signal appears at the limiting circuit 34 via the conductor 31, such can only occur if the voltage level exceeds the present reference voltage. Consequently, only such values will be recorded which exceed the allowable preset upper speed range, not however, those speeds which do not require enforcement i.e. below the required speed limit. When the starting impulse passes through the limiting circuit 34, that is to say, the stored voltage level is of a value which is to be recorded, then the starting impulse is supplied to a coupling-control circuit 38. This signal actuates an electro-magnetic coupling 54 through the intermediary of the conductor 48 and starts operation of an electric motor 50, but only in the event that a blocking plus potential does not appear at the conductor 41. This conductor 41 is controlled by means of a switch 40, which will be more fully described hereinafter with reference to FIGURE 4.

The electro-magnetic coupling 54 serves to detachably connect the shaft 52 of the drive motor 50 with a coaxially mounted shaft 58, at the one side of which there is secured the tap of a position-determining potentiometer 56 or the like, and further a guide arm 60 for a writing instrument 62. The writing instrument 62, preferably a ball-point pen or the like, can be moved from a starting position through an arcuate path for example about the axis $x$ against the force of a return spring 64 or the like, whereby the tap of the potentiometer 56 which is arranged at a stabilized direct current voltage source 103 delivers an electric signal or voltage level via the conductor 46 which is a measure for the position of the writing instrument 62.

When the coupling 54 and the drive motor 50 are excited via the conductor 48, then the writing instrument 62 is pivoted out of its starting position. The now changing potential at the tap of the potentiometer 56, thereby arrives via the line 46 at the comparison or matching stage 42. At this matching stage 42 there also appears the voltage level stored in the storage network 17 and supplied via the conductor 44. As soon as this stored voltage level and the voltage level or signal representing a measurement for the position of the writing member 62 correspond to one another, then the matching stage 42 delivers an impulse to the coupling control circuit 38 which momentarily causes disengagement of the coupling 54 and shutting-off of the drive motor 50. At this moment, also after the writing instrument 62 has moved through a path which corresponds to the measured value, there results a return movement of the writing instrument 62 into its starting position under the influence of the return spring 64.

Owing to the employed electronic means for controlling the electro-magnetic coupling 54, disengagement thereof is carried out exceptionally quickly due to reciprocal matching of both of the voltage levels appearing in conductors 44 and 46. In particular, the remaining short delay or time lag can be held within very small tolerances by means of suitable stabilizing measures known to the art, whereby the recording is still sufficiently precise also at higher motor revolutions or recording speed. By way of example, it is to be here mentioned that with a recording time in the magnitude of only approximately 1/10 second for a full-scale reading with a scale radius of 55 millimeters, the error can be maintained below 1%.

In FIGURE 2 there is depicted a data sheet 70 formed from printed cardboard or the like adapted to be employed in conjunction with the described recording apparatus of FIGURE 1. By means of perforations or apertures 72 and corresponding support pins (not shown) provided on the recording apparatus, the scale 74 can be arranged in the path of the writing instrument 62. In other words, the starting or zero point of the scale 74 and the radial center 76 can be brought into coincidence with the starting position of the writing instrument 62 and the axis of rotation $x$, respectively. The arc 78 represents a recording or marking made by the writing instrument 62, the terminal point of which indicates on the scale 74 the measured value which is to be recorded. The data sheet 70 preferably contains a form 72a for recording further accompanying information regarding the undertaken measurement.

It is to be appreciated that the scale 74, as can best be seen by referring to FIGURE 2, can have the markings thereof more widely spaced in the particularly interesting speed ranges, whereas in the other ranges the markings can be more closely positioned to one another, which only can be achieved merely through proper non-linear winding for example, of the position-determining potentiometer 56 in a known manner. When employing the previously mentioned frequency divider 12 of FIGURE 1 and the hereinafter to be described control means, it is possible to advantageously double the measuring range with a given deflection of the writing instrument 62, while maintaining the relative accuracy. More specifically, if the frequency of the impulses in the conductor 10 is halved before the input to the square-wave generator 13, thus, there corresponds in contrast to the previous condition an equal voltage level at the conductor 44 possessing a double measurement value. Now, it is only necessary to employ for the recording operation a data sheet 80 (FIGURE 3) with a suitably divided scale 84. The position of the perforations 82 and the scale 84 as well as the radial center 86 on the data sheet 80 correspond to that of the data sheet 70. Advantageously, in order to easily distinguish between these two data sheets 70 and 80 they can be formed of different color. In order to positively prevent improper or false recording the contact $b_1$ for the frequency divider 12 of FIGURE 1 can be automatically switched, for which purpose both data sheets 70 and 80 are provided at different locations at their upper marginal edges with recesses 79 and 89 which serve this purpose, as will be more fully described hereinafter.

There will now be undertaken a description of the control circuit in conjunction with the circuit diagram depicted in FIGURE 4. In the illustrated rest position, the magnet or relay D receives current via the contact 100 of the switch $S_1$. This magnet D serves to lift the writing instrument 62 from the writing surface (not shown in FIGURE 1), so that the data sheet 70 or 80 can be inserted and removed without there resulting that a disturbing or undesired marking will be made on such data sheet. As long as no data sheet is inserted, and the switch $S_1$ is not actuated and the magnet D is excited, there appears a plus potential at the conductor 41 (see also FIGURE 1) via the contact $d$, whereby as previously mentioned the coupling control circuit 38 remains blocked and no recording operation can be undertaken. Upon insertion of a data sheet 70 or 80, the switch $S_1$ is thrown into contact with terminal 101 due to an edge of this data sheet reaching the fixedly located end position of the switch $S_1$ upon insertion of the card support pins through the perforations 72 or 82, respectively. As a result of deenergization of the magnet D the writing instrument 62 is placed into its recording position, the blocking potential disappears at the conductor 41, and via the terminal point 101 of the switch $S_1$ and the self-holding rest contact $a_1$ a green alert lamp 90 is supplied with current. After the presence of a starting impulse in the coupling control circuit 38, the coupling 54 is excited as well as a parallelly connected relay E by connecting or switching-on a plus potential through the conductor 48 (FIGURES 1 and 4), which starts operation of the drive motor 50 through the contact $e_2$, whereupon the actual recording begins. The red lamp 91 and the relay A are excited via the contact $e_1$ which is in circuit with the plus potential supplied through the switch $S_1$ via its work contact $a_1$. The contact $a_3$ permits, if desired, as will be more fully described hereinafter controlled operation of a camera for the purpose of photographing the vehicle whose speed of movement is to be recorded. As soon as the voltage level at the conductors 44 and 46 correspond to one another, and upon removal of the plus potential at the conductor 48 by the matching stage 42 the magnetic coupling 54 and the relay E, as well as the drive motor 50 will no longer receive current, and there is again applied via the rest contact $e_3$ and the still closed contact $a_2$ a blocking potential at the conductor 41, so that a further recording on the same data sheet can not occur. The relay A and the red lamp 91 still remain in excited condition via the working side or terminal 101 of the switch $S_1$. The same blocking potential is also applied to the conductor 41 when the writing instrument 62 reaches the end value of the scale on the data sheet, and thereby (in a manner not shown) closes the terminal switch $s_4$. The blocking potential results in the immediate switching-off of the coupling 54 and the motor 50.

Only after removing the data sheet, that is to say, the return of the switch $S_1$ into its rest position as shown in FIGURE 1 there results a return movement of the switch $S_1$ into its starting position. The switch $S_1$ deenergizes the relay A and the lamp 91 and again immediately excites the lifting magnet or relay D. The further closing or blocking of the coupling-control circuit 38 is again undertaken by the contact $d$, until insertion of a new data sheet occurs. Thus, a further or new recording can only then occur after a new data sheet has been inserted into the apparatus.

Upon insertion of a data sheet there is also each time automatically determined whether the recording is to take place in the lower or in the higher measuring range. For this purpose, there is arranged within the operable reach of the recesses 79 and 89, the switches $S_2$ and $S_3$, respectively, which control the condition of excitation of a relay B. In the event that one is working with a data sheet 70 for recording the lower measuring range, then the switch $S_2$ will not be actuated on account of the presence of recess 79, but, however, there will result actuation of the switch $S_3$ as a result of the remaining uninterrupted or continuous marginal edge of the data sheet 70. Consequently, the relay B will not be excited, the switching contact $b_1$ remains in its rest position and the square-wave impulses appearing in the conductor 10 are directly supplied to the square-wave generator 13. If one is working with a data sheet 80 for recording the higher measuring range, then the switch $S_3$ is not actuated because of the recess 89, whereas the switch $S_2$ will be closed. The relay B is then excited and thus held via its contact $b_2$ and the switch $S_3$, and the contact $b_1$ influences by-passing of the square-wave impulse at the conductor 10 through the frequency divider 12. By virtue of this arrangement false recording is completely avoided with respect to the various possible measuring ranges.

As previously mentioned, actuation of the contact $a_3$ with each recording operation actuates the operating magnet of a photographic camera, which in turn causes operation of a flash bulb in a known manner. Thus, by means of the photograph one can easily discern the license number of the recorded vehicle. Preferably, there is employed a camera having a film magazine capable of taking several hundred photographs as well as a camera employing motor transport of the film and automatic shutter setter. In addition thereto, each photograph receives a consecutive number. With the advancing of the film there can be coupled an automatic electro-mechanical number stamp which during the recording operation of the apparatus is adapted to apply to the pertinent data sheet the same consecutive number in a manner familiar to the art. A pertinent signal can be provided which indicates the end of the film spool. Finally, in a known manner there can also be superimposed upon the photograph a visual picture of the indicating instrument 19, so that the measured value can be twice documented. The measuring or indicator instrument 19 must naturally be provided with both scales arranged parallel to one another when employing two measuring ranges. With the thus processed papers, the subsequent administrative evaluation of the recorded information can be very easily undertaken, and during the photographing itself the official or person operating the machine can direct his full attention to what is occurring on the road or area to be observed.

As will be appreciated and understood from the above description, the recording apparatus of the present invention completely prevents and overcomes the known disadvantages mentioned hereinabove. The speed of recording is very high while maintaining the necessary exactness. Additionally, the use of a ball point writing instrument in place of an ink pen or the like provides many advantages. The application of the marking to the data sheet occurs both during the forward and the return movement of the writing instrument 62, whereby there results a clearly discernable and pronounced marking. If necessary, there can be arranged in the region of the writing point a small heating arrangement which permits for clear and defined recording marking even under cold weather conditions. Above all, it is important to note that the recording apparatus is very economical in its use of the necessary recording material, since owing to the limiting circuit 34 only the critical values or interesting speed measurements are permanently recorded. Additionally, the document concerning the resulted measurement, which is in the form of a data sheet, is momentarily accessible, and can in all instances be shown and presented to the driver of the vehicle in question right at the place where the traffic infraction has occurred.

It is to be understood that numerous variations are possible to the construction and the use of the herein described recording apparatus. For example, the angle of deflection of the writing instrument does not necessarily have to extend through approximately 180°, as depicted in FIGURES 2 and 3, but rather can be larger or smaller. For particular applications, it is possible to advantageously provide a straight line recording path in place of an arcuate path, which can be easily realized by suitable provision of the driving means and the guide for the writing instrument, as will be apparent to those versed in the art. Naturally, instead of employing the lamp 91 to indicate that a speed recording has occurred, it is also possible to employ audible means or other suitable expedients.

Having thus described the nature of the present invention what is claimed and desired to be secured by United States Letters Patent is:

1. Apparatus for measuring and recording the speed of moving objects, particularly road vehicles or the like wherein a transmitted wave is reflected by said road vehicle and generates an electric signal characteristic for the speed of movement of said vehicle, which comprises: a writing instrument adapted to be displaced through a prescribed path of travel to perform a marking on an exchangeable data sheet for indicating speed of movement of said vehicle, drive means operatively connected to said writing instrument, variable voltage generating means cooperating with said writing instrument for generating a voltage which is a function of the displacement of said writing instrument, and an electric circuit coupled to said voltage generating means and said drive means, said electric circuit including means for producing an electric signal indicative of speed of movement of said vehicle, means for supplying an electric signal to said drive means to actuate the latter, and means for comparing said voltage of said voltage generating means with said speed indicative electric signal and adapted to arrest displacement of said writing instrument when said voltage and speed indicative electric signal are equal.

2. Apparatus for measuring and recording the speed of moving objects, particularly road vehicles or the like wherein a transmitted wave is reflected by said road vehicle and generates an electric signal characteristic for the speed of movement of said vehicle, which comprises: a writing instrument adapted to be displaced through a prescribed path of travel to perform a marking on an exchangeable data sheet for indicating speed of movement of said vehicle, a driven shaft member carrying said writing instrument, drive means operatively connected to said writing instrument, said drive means including a drive motor and an electric coupling for releasably connecting said drive motor in driving relation to said driven shaft, variable voltage generating means cooperating with said writing instrument for generating a voltage which is a function of the displacement of said writing instrument, and an electric circuit coupled to said voltage generating means and said drive means, said electric circuit including means for producing an electric signal indicative of speed of movement of said vehicle, means for supplying an electric signal to said drive means to actuate the latter, and means for comparing said voltage of said voltage generating means with said speed indicative electric signal and adapted to arrest displacement of said writing instrument when said voltage and speed indicative electric signal are equal.

3. Apparatus for measuring and recording the speed of moving objects according to claim 1; said variable voltage generating means comprising a positioning-determining potentiometer.

4. Apparatus for measuring and recording the speed of moving objects according to claim 1; including spring means cooperating with said writing instrument to return the latter to its starting position upon arresting of displacement of said writing instrument.

5. Apparatus for measuring and recording the speed of moving objects according to claim 2; said electric circuit including switch means for deenergizing said electric coupling upon performance of a full sweep of said writing instrument across said data sheet into an end position.

6. Apparatus for measuring and recording the speed of moving objects according to claim 2; wherein said drive motor and said electric coupling are actuated via a common conductor.

7. Apparatus for measuring and recording the speed of moving objects according to claim 1; said electric circuit including limiting means adapted to prevent processing of said speed indicative electric signal if such is below a reference value.

8. Apparatus for measuring and recording the speed of moving objects according to claim 7; wherein said limiting means includes preselector means permitting continual adjustment and selection of said reference value.

9. Apparatus for measuring and recording the speed of moving objects according to claim 1; said electric circuit including means for indicating completion of measuring and recording of the speed of said vehicle.

10. Apparatus for measuring and recording the speed of moving objects, particularly road vehicles or the like wherein a transmitted wave is reflected by said road vehicle and generates an electric signal characteristic for the speed of movement of said vehicle, which comprises: a writing instrument adapted to be displaced through a prescribed path of travel to perform a marking on an exchangeable data sheet for indicating speed of movement of said vehicle, drive means operatively connected to said writing instrument, variable voltage generating means cooperating with said writing instrument for generating a voltage which is a function of the displacement of said writing instrument, and an electric circuit coupled to said voltage generating means and said drive means, said electric circuit including means for producing an electric signal indicative of speed of movement of said vehicle, means for supplying an electric signal to said drive means to actuate the latter, means for comparing said voltage of said voltage generating means with said speed indicative electric signal and adapted to arrest displacement of said writing instrument when said voltage and speed indicative electric signal are equal, switch means adapted to be actuated by insertion of said data sheet for moving said writing instrument into its marking position, said actuated switch means being adapted to remove a blocking potential normally preventing speed recording when no data sheet is inserted in said apparatus.

11. Apparatus for meausring and recording the speed of moving objects according to claim 10; said electric circuit including means for applying a blocking potential to said apparatus upon performance of a speed measurement and recording upon said data sheet, to thereby prevent subsequent recording until removal of the previously marked data sheet and insertion of a new data sheet.

12. Apparatus for measuring and recording the speed of moving objects, particularly road vehicles or the like wherein a transmitted wave is reflected by said road vehicle and generates an electric signal characteristic for the speed of movement of said vehicle, which comprises: a writing instrument adapted to be displaced through a prescribed path of travel to perform a marking on an exchangeable data sheet for indicating speed of movement of said vehicle, drive means operatively connected to said writing instrument, variable voltage generating means cooperating with said writing instrument for generating a voltage which is a function of the displacement of said writing instrument, and an electric circuit coupled to said voltage generating means and said drive means, said electric circuit including means for producing an electric signal indicative of speed of movement of said vehicle, means for supplying an electric signal to said drive means to actuate the latter, means for comparing said voltage of said voltage generating means with said speed indicative electric signal and adapted to arrest displacement of said writing instrument when said voltage and speed indicative electric signal are equal, frequency divider means for changing of the speed ranges to be recorded, switch means operatively associated with said frequency divider means to actuate the latter for operation at a desired frequency range, said switch means being automatically moved into a desired position upon insertion of a corresponding data sheet provided with means for moving said switch means into a desired operating position.

13. Apparatus for measuring and recording the speed of moving objects according to claim 1; said electric circuit including storage means for storing said speed indicative electric signal, an indicator operably connected to said storage means and adapted to be actuated thereby for visually depicting the measured speed value, said comparing means being in circuit with the output of said storage means.

14. Apparatus for measuring and recording the speed of moving objects according to claim 13; said electric circuit including extinguishing means in circuit with said storage means for extinguishing said stored speed indicative electric signal prior to recording thereof by said writing instrument.

15. In apparatus for measuring and recording the speed of moving objects wherein a transmitted wave is reflected by said moving object and is caused to generate an electric signal indicative of the speed of said moving object, a circuit which comprises: means for generating an electric signal indicative of speed of movement of said object, storage means for storing said generated electric signal, means for controlling said storage means, means for supplying an electric signal exceeding a predetermined value and adapted to displace a writing instrument, means operatively associated with said supplying means for producing an electric signal proportional to the degree of displacement of said writing instrument, and means for matching said produced electric signal with said speed indicative electric signal.

16. In apparatus for measuring and recording the speed of moving objects wherein a transmitted wave is reflected by said moving object and produces an electric signal indicative of the speed of said moving object, a circuit which comprises in combination: means for producing an electric signal indicative for speed of movement of said object, storage means for storing said produced electric signal, means for controlling said storage means, means coupled with said controlling means for delivering an electric signal adapted to displace a writing instrument, means operatively associated with said delivering means for generating an electric signal proportional to the degree of displacement of said writing instrument, means operable with said storage means for matching said generated electric signal with said speed indicative electric signal, said matching means being electrically coupled with said delivering means for deactuating the latter when said speed indicative signal and said generated signal correspond to one another, to thereby arrest movement of said writing instrument.

17. In apparatus for measuring and recording the speed of moving objects wherein a delivered wave is reflected by said moving object and is caused to produce an electric signal indicative of the speed of said moving object, a circuit which comprises: means for producing an electric signal indicative of the speed of said object, storage means for storing said produced electric signal, means for controlling said storage means, means actuated by said controlling means for supplying an electric signal which exceeds a preselected value and adapted to displace a writing instrument, means operatively associated with said supplying means for producing an electric signal proportional to the degree of displacement of said writing instrument, means for matching said produced electric signal with said speed indicative electric signal, said matching means being electrically coupled with said supplying means for deactuating the latter when said speed indicative signal and said produced electric signal correspond to one another, and adapted to thereby arrest movement of said writing instrument, said supplying means including limiting means permitting adjustment and selection of the value of electric signals employed to displace said writing instrument, to thus eliminate electric signals, the value of which correspond to nonpertinent speeds which are not desired to be recorded.

18. In apparatus for measuring and recording the speed of moving objects, particularly road vehicles, wherein a transmitted wave is reflected by said road vehicle and generates an electric signal characteristic for the speed of movement of said vehicle, the combination with a writing instrument adapted to be displaced through a prescribed path of travel to perform a marking on a data sheet indicating such speed of movement, drive means including a drive motor and an electric coupling operatively connected to said writing instrument, variable voltage generating means cooperating with said writing instrument for generating a voltage which is a function of the displacement of said writing instrument, of an electric circuit coupled to said voltage generating means and said drive means, said electric circuit including means for producing an electric signal indicative of speed of movement of said vehicle, means for supplying an electric signal exceeding a predetermined value to said drive means to actuate the latter, and means for comparing said voltage of said voltage generating means with said speed indicative electric signal and adapted to deenergize said drive means to arrest displacement of said writing instrument when said voltage and speed indicative electric signal are equal.

19. In apparatus for measuring and recording the speed of moving objects according to claim 18; said supplying means including limiting means and coupling control means, said electric circuit further including storage means for storing said produced electric signal, extinguishing means for extinguishing said stored electric signal prior to recording, and start-delay means in circuit with said storage means and said supplying means for preventing operation of said supplying means unless a clearly pronounced signal appears at the input to said storage means.

References Cited in the file of this patent
UNITED STATES PATENTS

| | | |
|---|---|---|
| 2,419,099 | Wall | Apr. 15, 1947 |
| 2,785,395 | Platzman | Mar. 12, 1957 |